(12) United States Patent
Navin

(10) Patent No.: US 8,326,722 B2
(45) Date of Patent: Dec. 4, 2012

(54) ESTIMATING RISK OF A PORTFOLIO OF FINANCIAL INVESTMENTS

(75) Inventor: Robert Lloyd Navin, New York, NY (US)

(73) Assignee: Warp 11 Holdings, LLC, New York, NY (US)

( * ) Notice: Subject to any disclaimer, the term of this patent is extended or adjusted under 35 U.S.C. 154(b) by 1409 days.

(21) Appl. No.: 11/198,301

(22) Filed: Aug. 8, 2005

(65) Prior Publication Data
US 2007/0033123 A1 Feb. 8, 2007

(51) Int. Cl.
*G06Q 40/00* (2012.01)
(52) U.S. Cl. .................................................. 705/36 R
(58) Field of Classification Search .................. None
See application file for complete search history.

(56) References Cited

U.S. PATENT DOCUMENTS

| | | | | |
|---|---|---|---|---|
| 5,819,237 A * | 10/1998 | Garman | ....................... | 705/36 R |
| 6,078,904 A | 6/2000 | Rebane | | |
| 6,173,276 B1 | 1/2001 | Kant et al. | | |
| 6,405,179 B1 * | 6/2002 | Rebane | ....................... | 705/36 R |
| 6,772,136 B2 | 8/2004 | Kant et al. | | |
| 7,191,161 B1 * | 3/2007 | Rai et al. | ......................... | 706/15 |
| 7,937,313 B2 | 5/2011 | Browne et al. | | |
| 2002/0010667 A1 * | 1/2002 | Kant et al. | ....................... | 705/35 |
| 2002/0138387 A1 | 9/2002 | Griffin | | |
| 2003/0139993 A1 * | 7/2003 | Feuerverger | ..................... | 705/36 |
| 2003/0177077 A1 * | 9/2003 | Norman | .......................... | 705/35 |
| 2003/0184399 A1 * | 10/2003 | Lanoue et al. | ................ | 331/176 |
| 2003/0236742 A1 | 12/2003 | Lawrence | | |
| 2004/0064394 A1 | 4/2004 | Wallman | | |
| 2004/0172352 A1 | 9/2004 | Deretz | | |
| 2004/0177020 A1 | 9/2004 | Alderman et al. | | |
| 2004/0199447 A1 | 10/2004 | Treynor | | |
| 2004/0199448 A1 | 10/2004 | Chalermkraivuth et al. | | |
| 2005/0027638 A1 | 2/2005 | Ng et al. | | |
| 2005/0027645 A1 * | 2/2005 | Lui et al. | .......................... | 705/38 |
| 2005/0033672 A1 | 2/2005 | Lasry et al. | | |
| 2005/0144051 A1 * | 6/2005 | Wilson | ............................. | 705/7 |
| 2005/0154668 A1 * | 7/2005 | Burns et al. | ..................... | 705/37 |
| 2006/0129410 A1 * | 6/2006 | Reisenfeld et al. | ........... | 704/278 |
| 2006/0265296 A1 * | 11/2006 | Glinberg et al. | ................ | 705/35 |

FOREIGN PATENT DOCUMENTS

| | | |
|---|---|---|
| JP | 2004038952 A | 2/2004 |
| JP | 2005516308 A | 6/2005 |
| WO | WO03065275 A1 | 8/2003 |

OTHER PUBLICATIONS

Sanjay K. Nawalkha, Gloria M. Soto, Jun Zhang; Generalized M-vector models for Hedging Interest Rate Risk; Journal of Banking & Finance; 27 (2003) 1581-1604.*

(Continued)

*Primary Examiner* — Virpi Kanervo
(74) *Attorney, Agent, or Firm* — Fish & Richardson P.C.

(57) ABSTRACT

An estimate of the effect of a market condition or conditions on a portfolio of financial investments is determined. Financial risk for a portfolio of financial investments is estimated for particular observed parameter values that affect the value of the portfolio. The financial risk is estimated based on previously calculated measurements of risk of the portfolio for a previously selected range of values of the parameters.

40 Claims, 6 Drawing Sheets

OTHER PUBLICATIONS

Arturo Estrella, Darryll Hendricks, et al.; The Price Risk of Options Positions: Measurement and Capital Requirements; Quarterly Review; Summer/Fall 1994; vol. 19 Issue 2, p. 27.*

Gobind Daryanani; Sensitivity Simulations: A Faster Alternative to Monte Carlo; Journal of financial Planning; Sep. 2002; p. 104.*

Khindanova et. al.; "Stable Modeling of Value at Risk"; Mathematical and Computer Modelling; vol. 34, pp. 1223-1259, (2001).*

Bangia et. al.; "Ratings Migration and Business Cycle, with Application to Credit Portfolio Stress Testing"; Journal of Banking and Finance; vol. 26, pp. 445-474, (2002).*

Stambaugh, Fred; "Risk and Value at Risk"; European Management Journal; vol. 14, No. 6, pp. 612-621, (1996).*

Search Report from International Application No. PCT/US 06/26635, dated Dec. 17, 2006, 8 pages.

Andersen, et al.; "Jump-Diffusion Processes: Volatility Smile Fitting and Numerical Methods for Option Pricing"; Review of Derivatives Research, vol. 4; pp. 231-262 (2000).

Kraaijpoel, Derk; "Chapter 4—Accurate Interpolation Using Derivatives" in *Seismic Ray Fields and Ray Field Maps: Theory and Algorithms*, No. 234; pp. 43-66 (1974); available through Igitur, Utrecht Publishing & Archiving Services at http://www.library.uu.nl/digiarchief/dip/diss/2003-1028-125323/c4.pdf.

Pritsker, Matthew; "Evaluating Value at Risk Methodologies: Accuracy Versus Computational Time"; Journal of Financial Services Research, vol. 12, No. 2/3; pp. 201-242 (1997).

European Search Report issued in Application No. 06786700.2, mailed Jul. 2, 2010, 9 pages.

"Statement in Accordance with the Notice from the European Patent Office dated Oct. 1, 2007 Concerning Business Methods," Journal of the European Patent Office, Nov. 1, 2007, pp. 592-593, XP002456252, ISSN: 0170-9291.

Bunnin, F. O. et al. 'Design of High Performance Financial Modeling Environment'. Parallel Computing, vol. 26, No. 5, Mar. 2000, pp. 601-622.

Dixon, Matthew F. et al. "Using Distributed Computers to Deterministically Approximate Higher Dimensional Convection Diffusion Equations". The Journal of Supercomputing, vol. 28, No. 2, May 2004. pp. 235-253.

Randall, Curt et al. "Numerical Options Models Without Programming", Proceedings of the IEEE/IAFE 1997 Computational Intelligence for Financial Engineering (CIFEr), Mar. 1997, pp. 15-21.

Japanese Office Action issued in JP 2008-526010, drafted on Feb. 20, 2012 and issued on Feb. 27, 2012, English Translation, 4 pages.

* cited by examiner

140

| parameter values / portfolio holdings | 315a<br>1.00% | 315b<br>1.50% | 315c<br>2.00% | ...... | 315n<br>4.00% |
|---|---|---|---|---|---|
| 305a — Holding 1 | $100,000 | $200,000 | $300,000 | ...... | $800,000 |
| 305b — Holding 2 | $100,000 | $200,000 | $300,000 | ...... | $800,000 |
| 305c — Holding 3 | $100,000 | $200,000 | $300,000 | ...... | $800,000 |
| ⋮ | ⋮ | ⋮ | ⋮ | ⋱ | ⋮ |
| 305n — Holding n | $100,000 | $200,000 | $300,000 | ...... | $800,000 |
| 310 — Entire Portfolio | $400,000 | $800,000 | $1,200,000 | ...... | $3,200,000 |

| Portfolio Holdings Risk Measurement Estimation | □ − □ × |

Portfolio Holdings:

Holding 1
Holding 2
Holding 3
Holding 4

Estimated Risk to a $2.55 price value and a 1.23% interest rate value:

Holding 1: $100
Holding 2: $500
Holding 3: $100
Holding 4: $100

Portfolio: $800

Reallocation strategy:
sell 4 shares of Holding 2 (risk estimate reduced to $400)

605     615

Trade Securities:

Security: [　　　　　]     ☐ Buy    Quantity: [　　　　　]

☐ Sell    Price: [　　　　　]   [Submit]

620

Parameters and Values:

Interest Rate (0.50%–4.00% value) —— 610a
Price ($1.00–$3.00 value) —— 610b

ESTIMATING RISK OF A PORTFOLIO OF FINANCIAL INVESTMENTS

TECHNICAL FIELD

This document relates to estimating a risk of a financial portfolio including a large number of holdings.

BACKGROUND

A portfolio of financial investments may include a large number of derivative investment holdings. A derivative investment holding is a financial instrument where the price of the financial instrument is derived from the underlying financial asset. A derivative investment holding also may be referred to as a contingent claim or a derivative. Examples of a derivative include an exchange-traded stock option, a convertible bond, and a credit default swap. Computer systems may be used to calculate the current or projected value of a financial investment holding or a collection of financial holdings.

SUMMARY

In one general aspect, an estimate of risk of a portfolio of a plurality of financial investment holdings to fluctuations in portfolio value is provided. An indication of a first set of values of at least two parameters is received. The first set of values includes a first value for each of the at least two parameters. An indication of a predetermined measurement of risk of a portfolio holding to a second set of values of the at least two parameters is accessed. The second set of values includes a second value for each of the at least two parameters. An indication of a predetermined measurement of risk of the holding to a third set of values of the at least two parameters is accessed. The third set of values includes a third value for each of the at least two parameters such that the third set of values is different from the second set of values. Taylor Series expansion is used to identify multiple estimated measurements of risk of the holding to multiple values of one of the at least two parameters. The multiple estimated measures of risk are identified based on the accessed indication of the predetermined measurement of risk of the holding to the second set of values and the accessed indication of the predetermined measurement of risk of the holding to the third set of values. Polynomial interpolation is used to estimate a measurement of risk of the holding to the first set of values based on the multiple estimated measurements of risk.

Implementations may include one or more of the following features. For example, the predetermined measurement of risk of the holding to the second set of values may be identified. An indication of the predetermined measurement of risk of the holding to the second set of values may be made accessible for later use. The predetermined measurement of risk of the holding to the third set of values may be identified. An indication of the predetermined measurement of risk of the holding to the third set of values may be made accessible for later use.

An indication of multiple values of the at least two parameters may be accessed. A predetermined measurement of risk of the portfolio holding to the set of values may be identified where each set of values of the at least two parameters includes one of a subset of the multiple values for each of the at least two parameters. An indication of the predetermined measurement of risk of the portfolio holding to the set of values for each set of values may be made accessible for later use.

A predetermined measurement of risk of the portfolio holding to the second set of values may be identified for each of a first subset of the portfolio holdings. An indication of the predetermined measurement of risk of the portfolio holding to the second set of values may be made accessible for each of the first subset of the portfolio holdings and for later use. A predetermined measurement of risk of the portfolio holding to the third set of values may be identified for each of a second subset of the portfolio holdings. An indication of the predetermined measurement of risk of the portfolio holding to the third set of values may be made accessible for each of the second subset of the portfolio holdings accessible and for later use.

The predetermined measurement of risk of the holding to the second set of values may be identified at a time when the portfolio holdings may not be traded. The predetermined measurement of risk of the holding to the third set of values may be identified at a time when the portfolio holdings may not be traded. The indication of the first set of values may be identified at a time when the portfolio holdings are permitted to be traded.

The predetermined measurement of risk of the holding to the second set of values may be identified before the indication of the first set of values is received. The predetermined measurement of risk of the holding to the third set of values may be identified before the indication of the first set of values is received.

An indication of a predetermined measurement of risk of a second portfolio holding to the second set of values may be received. An indication of a predetermined measurement of risk of the second holding to the third set of values may be accessed. Taylor Series expansion may be used to identify multiple estimated measurements of risk of the second portfolio holding to multiple values of one of the at least two parameters. Multiple estimated measurements may be identified based on the accessed indication of the predetermined measurement of risk of the second portfolio holding to the second set of values and the accessed indication of the predetermined measurement of risk of the second portfolio holding to the third set of values. Polynomial interpolation may be used to estimate a measurement of risk of the second holding to the first set of values based on the multiple estimated measurements of risk.

An indication of a predetermined measurement of risk of the holding to the second set of values may be accessed for each of a first subset of the portfolio holdings. An indication of a predetermined measurement of risk of the holding to the third set of values may be accessed for each of a second subset of the portfolio holdings. A measurement of risk of the portfolio to the first set of values may be estimated based on the accessed indications of the predetermined measurements of risk of the first subset of the portfolio holdings to the second value and the accessed indications of the predetermined measurement of risk of the second subset of the portfolio holdings to the third value.

A measurement of risk of the holding to the first set of values may be estimated for each of the portfolio holdings. The measurement of risk of the holding may be based on the accessed indication of the predetermined measurement of risk of the holding to the second set of values and the accessed indication of the predetermined measurement of risk of the holding to the third set of values. The estimated measurements for the portfolio holdings may be aggregated into an estimate of the measurement of risk of the portfolio to the first set of values.

The predetermined measurements of risk of the portfolio holdings to the second set of values may be aggregated into a measurement of risk of the portfolio to the second set of values. The predetermined measurements of risk of the portfolio holdings to the third set of values may be aggregated into a measurement of risk of the portfolio to the third set of values. The measurement of risk of the portfolio to the first set of values may be estimated based on the measurement of risk of the portfolio to the second set of values and the measurement of risk of the portfolio to the third set of values.

An allocation of the portfolio holdings may be identified that reduces the estimated measurement of risk of the portfolio to the first set of values. Modification of the portfolio holdings to have the identified allocation may be signaled.

A measurement of risk of the portfolio to a set of values may include a measurement of the amount by which the set of values of the portfolio changes as a result of a change in the parameter from an original set of values to the set of values. A measurement of risk of a portfolio holding to a set of values of the parameter may include a measurement of the amount by which the set of values of the holding changes as a result of a change in the parameter from an original set of values to the set of values.

One of the at least two parameters may be a state variable, and others of the at least two parameters may be non-state variables. Taylor Series expansion may be used to identify multiple estimated measurements of risk of the holding to multiple values of the state variable. The multiple estimated measurements of risk may be identified based on an accessed indication of a predetermined measurement of risk of the holding to values of the non-state variables included in the second set of values and an accessed indication of a predetermined measurement of risk of the holding to values of the non-state variables included in the third set of values. Polynomial interpolation may be used to estimate a measurement of risk of the holding to the state variable. A number of expansion terms to be used in the Taylor Series expansion may be identified.

The portfolio holdings may include at least one derivative holding. The identified parameter may include at least one of an interest rate, a price, a maturity interest rate, a price of an exchange-traded stock, a price of a maturity bond, a price of a credit default swap, and a current foreign exchange rate.

These aspects may be implemented using a system, a method, or a computer program, or any combination of systems, methods, and computer programs.

Other features will be apparent from the description and drawings, and from the claims.

DESCRIPTION OF DRAWINGS

FIG. 3 is an illustration of pre-calculated measurements of risk of a portfolio to values of a parameter that affects the portfolio value.

FIG. 6 is an illustration of a user interface for presenting measurements of risk of a portfolio to values of parameters that affect the portfolio value.

Like reference symbols in the various drawings indicate like elements.

DETAILED DESCRIPTION

Figure 1:
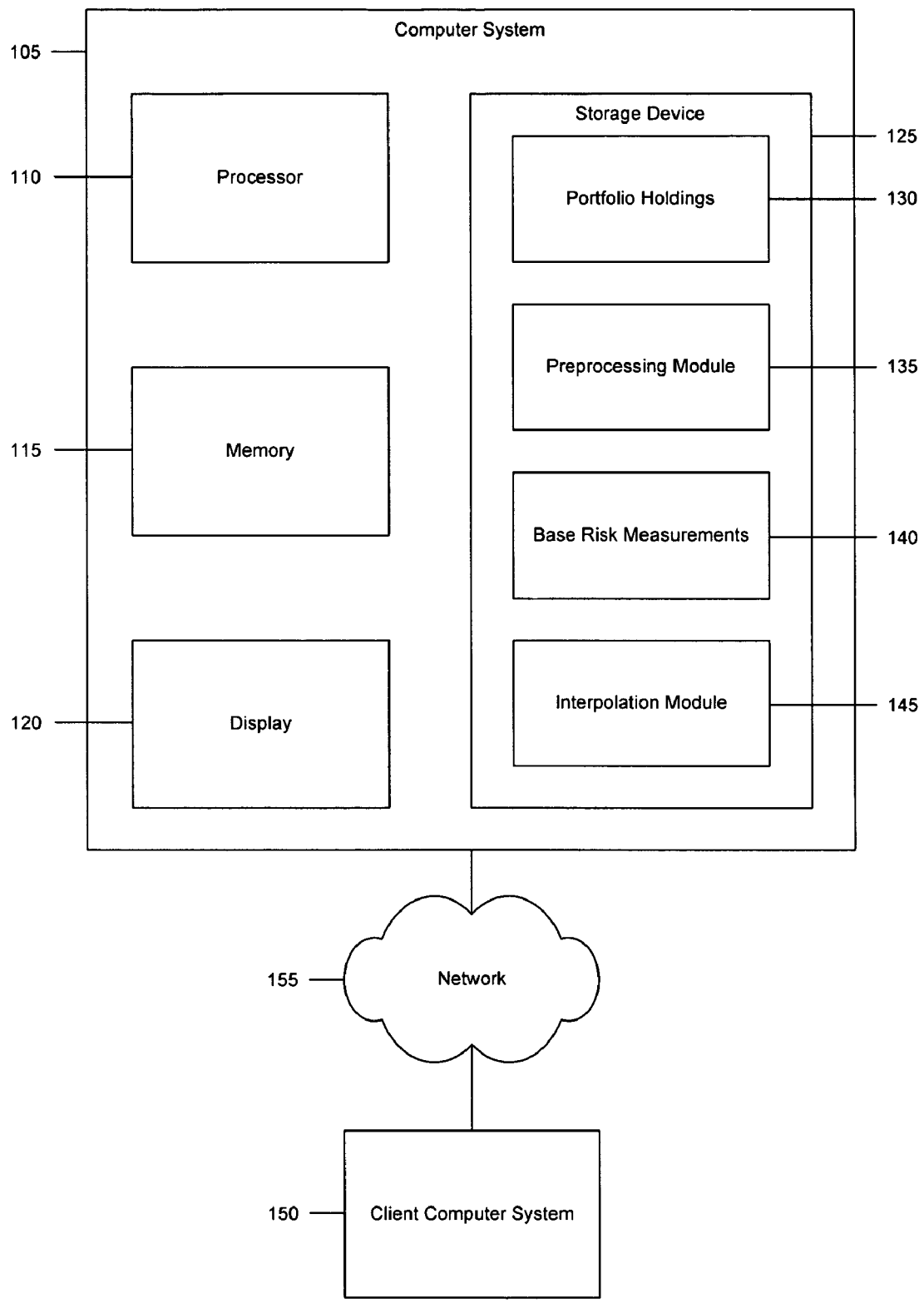
FIG. 1 is a block diagram of a computer system for estimating risk of a portfolio including derivative holdings.

To fully understand the techniques presented in this description, the challenges and issues of estimating financial risk for a portfolio of financial investments or holdings, particularly a portfolio including a large number of derivative holdings, need to be understood. The value of an investment portfolio of derivatives may fluctuate based on changes in one or more market conditions that affect many or most investments (such as interest rates and market liquidity) and/or based on changes in one or more market conditions that affect a particular type of derivative holding (such as, for example, the stock price change of an exchange-traded stock option and a change in the credit default swap price for a company based on a change in the credit quality of the company). The fluctuations of market conditions may cause significant changes in value of a portfolio. The effect of a market condition change on the value of the portfolio may be difficult to intuitively understand, particularly when a portfolio includes a large number of diverse derivatives, for example, when a portfolio includes hundreds, or perhaps thousands, of derivatives.

To help manage financial risk against changes in market conditions, an owner or a manager of a portfolio may monitor market conditions and adjust risks of the portfolio, such as by buying or selling derivatives, in response to actual or predicted changes in market conditions. In one example, an owner or a manager of a portfolio may want to manage risk associated with stock price changes for exchange-traded stock options by buying or selling stock against the options to reduce the overall market exposure. This may be referred to as hedging against equity risk. In another example, an owner or a manager of a portfolio may want to reduce risk associated with interest rate fluctuations by buying or selling other interest rate derivatives. This may be referred to as hedging against interest rate risk.

A computer system may be used to determine an estimate of the effect of a market condition or conditions on a portfolio of derivatives. In general, a price of a derivative in a portfolio is not able to be represented as an analytic function of the prices of the relevant market conditions and the underlying financial asset of the derivative. Consequently, numerical methods may be required to determine the price of a derivative. Conventional numerical methods include finite-difference (or grid) methods and Monte Carlo methods. Grid methods include approximate numerical solutions to partial differential equations by putting the equation onto a lattice. Such equations are often derivable given a particular stochastic process for the underlying securities. Monte Carlo methods include statistical simulations that use computer-generated values of variables to simulate market conditions.

Both grid methods and Monte Carlo methods generally require a tenth of a second or more to value a single derivative using computer systems that are generally available. Consequently, calculating the value of a portfolio of derivatives based on a fluctuation in a market condition may take a significant amount of time. For example, calculating the value of the portfolio may take more than one minute when the number of derivatives is large. Calculating the value of a portfolio of derivatives for a range of fluctuations in multiple market conditions also may require a substantial amount of time. Therefore, the financial values for some or all derivatives of a portfolio may not be available for presentation until a significant amount of time has passed from the time when the financial values were requested to be determined.

Financial risk for a portfolio of financial investments, particularly a large number of derivative holdings, may be estimated for particular observed parameter values that affect the value of the portfolio (e.g., a particular interest rate value or a particular price of an exchange-traded stock options) based on previously calculated measurements of risk of the portfolio for a previously selected range of values of the parameters. A measurement of risk for the portfolio may include a measurement of an amount by which the value of the portfolio changes as a result of changes from original values of one or more parameters to the changed values of the one or more parameters. For example, a combination of polynomial interpolation and Taylor Series expansion may be used to estimate the risk measurement. The previously calculated risk measurements may be identified before the measurement of risk of the portfolio is requested. In addition, a reallocation strategy for modifying the holding of the portfolio to minimize the estimated risk measurement may be provided and employed. Estimating a particular risk measurement based on other previously calculated risk measurements eliminates the need to explicitly calculate the particular risk measurement, which may be computationally expensive. The estimation of the risk measurement through polynomial interpolation and Taylor Series expansion may be performed when the risk measurement is requested to rapidly provide a response to the request more than if the measurement were explicitly calculated.

Referring to FIG. 1, a risk management system 100 is used to estimate and manage the risk of a portfolio of financial investments that includes multiple derivative holdings. The risk management system 100 estimates a measurement of risk of the portfolio to values of parameters that affect the value of the portfolio based on previously calculated measurements of the risk of the portfolio to other values of the parameters. The risk management system 100 includes a computer system 105 that includes a processor 110, a memory 115, and a display 120. The computer system 105 also includes a storage device 125 that persistently stores portfolio holdings 130, a preprocessing module 135, base risk measurements 140, and an interpolation module 145. The computer system 105 may communicate with a client computer system 150 through a network 155.

The processor 110 is capable of processing instructions for execution within the computer system 105. In one implementation, the processor 110 is a single-threaded processor. In another implementation, the processor 110 is a multi-threaded processor. The processor 110 is capable of processing instructions stored in the memory 115 or on the storage device 125. The processor 110 may cause graphical information for a graphical user interface (GUI) to be presented on the display 120.

The memory 115 stores information within the computer system 105. In one implementation, the memory 115 is a computer-readable medium. In one implementation, the memory 115 is a volatile memory unit. In another implementation, the memory 115 is a non-volatile memory unit.

The display 120 is an output device of the computer system 105 on which, for example, a graphical user interface indicating measurements of risk of a portfolio to values of the parameters may be displayed. The graphical user interface may enable a user of the computer system 105 to provide an indication of values of the parameters for which a measurement of risk is to be estimated. The computer system 105 also may include other output devices, such as speakers or a printer. In addition, the computer system 105 may include input devices, such as a keyboard, a pointing device, a touch screen, a camera, or a microphone.

The storage device 125 is capable of providing mass storage for the computer system 105 and includes a computer-readable medium for persistent data storage. In various different implementations, the storage device 125 may be a floppy disk device, a hard disk device, an optical disk device, or a tape device.

Figure 2:
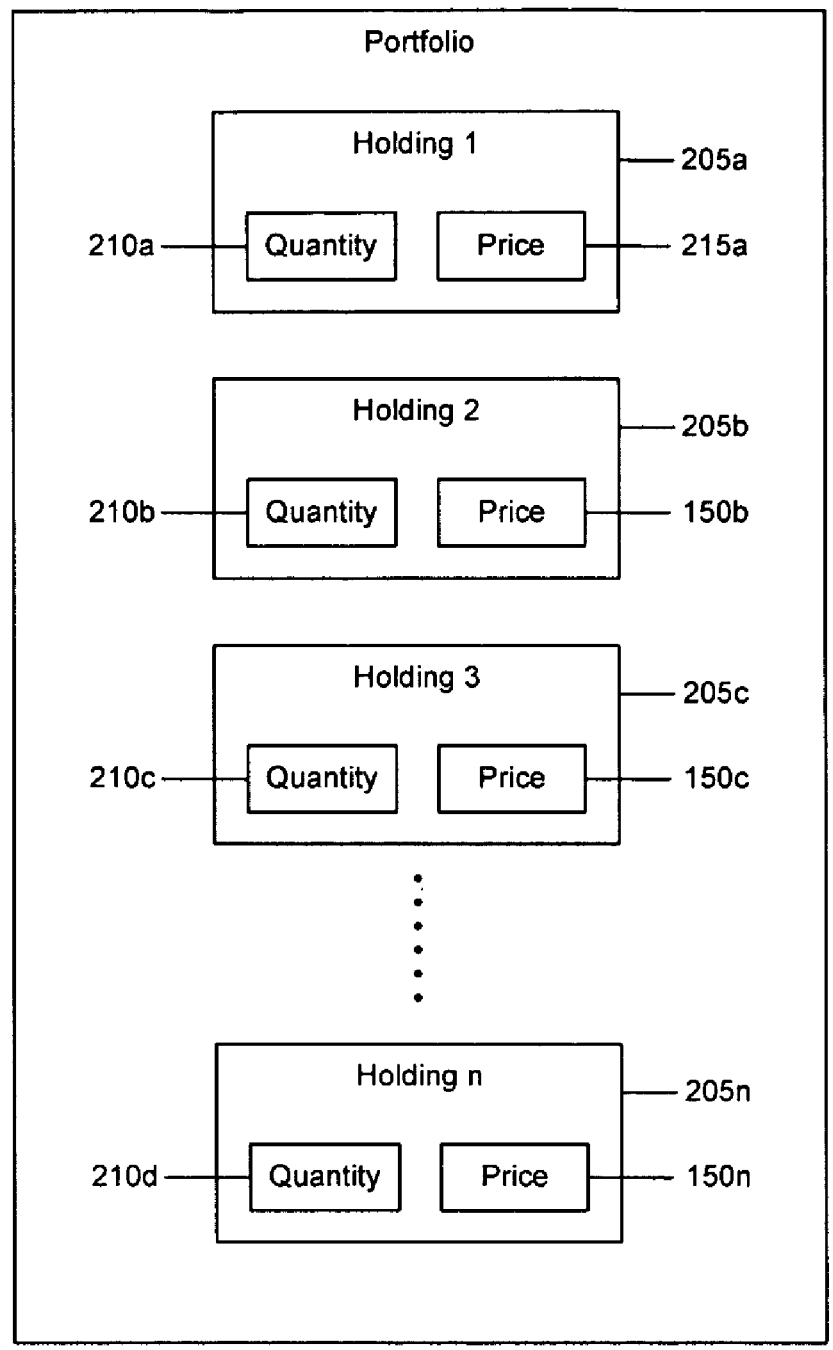
FIG. 2 is a block diagram of a portfolio including multiple holdings.

Referring also to FIG. 2, the portfolio holdings 130 includes an indication of multiple holdings 205a-205n included in a portfolio. In some implementations, the portfolio includes between 100 and 1000 holdings. In typical implementations, at least one of the holdings 205a-205n is a derivative holding, such as an exchange-traded stock option, a convertible bond, or a credit default swap. In some implementations, the holdings 205a-205n include many, perhaps hundreds or thousands, of derivative holdings.

Within the portfolio holdings 130, the holdings 205a-205n have associated quantities 210a-210n and prices 215a-215n. The quantity of a holding represents the number of units of the holding that are included in the portfolio. The price of a holding represents the price at which units of the holding may be traded. For example, the price may represent the price at which the units may have been traded as of the most recent closing of a market in which the units may be traded. In one implementation, the portfolio holdings 130 may include indications of other statistics describing the holdings 205a-205n, such as prices at which the holdings 205a-205n were purchased, and amounts by which the prices of the holdings 205a-205n have changed since the holdings 205a-205n were purchased. Each of the holdings 205a-205n may include an identifier that uniquely identifies the holding within the portfolio holdings 130.

Referring again to FIG. 1, the preprocessing module 135 includes instructions that cause the processor 110 to calculate measurements of risk of the portfolio indicated by the portfolio holdings 130 to values of parameters that affect an aggregate value of the portfolio. For example, the preprocessing module 135 may calculate the effects of a maturity interest rate, a price of an exchange-traded stock, a price of a maturity bond, a price of a credit default swap, or a current foreign exchange rate. The preprocessing module 135 stores the calculated measurements of risk within the base risk measurements 140. The instructions implemented by the preprocessing module 135 are described in further detail with respect to FIG. 4.

Referring also to FIG. 3, the base risk measurements 140 includes indications of previously calculated (or otherwise predetermined) measurements of risk of the portfolio indicated by the portfolio holdings 130 to values of one or more parameters that affect a value of the portfolio. The measurements of risk are calculated and stored for later use in the base risk measurements 140 through execution of the instructions of the preprocessing module 135. The instructions of the preprocessing module 135 may be executed, for example, at a time when the holdings identified by the portfolio holdings 130 may not be traded and before a request for an estimated risk measurement is received.

In one implementation, a portion of the base risk measurements 140 may be organized as a table having rows 305a-305n and 310 and columns 315a-315n. Each of the rows 305a-305n corresponds to a holding of the portfolio, and the row 310 corresponds to the portfolio as a whole. Each of the columns 315a-315n corresponds to a value of a parameter. Therefore, the value at the intersection of one of the rows 305a-305n and one of the columns 315a-315n represents a measurement of risk of a holding corresponding to the row to a value corresponding to the column. For example, the row 305*b* and the column 315*c* indicate that the value of "Holding 2" will fluctuate by $300,000 in response to a 2.00% interest rate value.

Similarly, the value at the intersection of the row 310 and one of the columns 315*a*-315*n* represents a measurement of risk of the portfolio to a value corresponding to the column. For example, the row 310 and the column 315*n* indicate that the value of the portfolio will fluctuate by $3,200,000 in response to a 4.00% interest rate value. In one implementation, the value at the intersection of the row 310 and one of the columns 315*a*-315*n* is the sum of the other values in the column. In other words, the measurement of risk of the portfolio to a value may be the sum of the measurements of risk of the holdings of the portfolio to the value.

In typical implementations, the value of the portfolio and the holdings of the portfolio is affected by multiple parameters. In such implementations, the base risk measurements 140 includes a risk measurement for each of multiple sets of parameter values. Each set of parameter values includes a value for each of the parameters that affects the value of the portfolio.

Referring again to FIG. 1, the interpolation module 145 includes instructions that cause the processor 110 to estimate a measurement of risk of the portfolio indicated by the portfolio holdings 130 to values of parameters that affect an aggregate value of the portfolio. More particularly, the interpolation module estimates the risk measurement based on the previously calculated risk measurements stored within the base risk measurements 140. For example, the interpolation module 145 may use Taylor Series expansion to identify multiple estimated measurements of risk of the portfolio to one or more of the parameters based on the previously calculated risk measurements. The interpolation module may use polynomial interpolation to estimate the measurement of risk of the portfolio to the parameter values based on the multiple estimated risk measurements.

Therefore, risk measurements for other values of the parameters must be stored within the base risk measurements 140 before the measurement of risk of the portfolio to the values may be estimated. For example, the values of the parameters for which the estimated risk measurement is calculated may be received when the portfolio holdings may be traded, and the risk measurement may be estimated at such a time. Because the risk measurements for the other values are persistently stored for later use within the base risk measurements 140 at a time when the holdings identified by the portfolio holdings 130 may not be traded, the estimated risk measurement is identified after the risk measurements have been persistently stored. The indication of the values of the parameters for which the risk measurement is to be identified may be provided by user input, or by an automatic source of the parameter values, such as a ticker that provides parameter values while the portfolio holdings may be traded. For example, the parameter values for which the risk measurement is estimated may be taken from a price feed or another financial data feed that is provided to the interpolation module 145. The interpolation module 145 may cause the estimated risk measurement be presented on a graphical user interface that is displayed on the display 120. The instructions implemented by the interpolation module 145 are described in further detail with respect to FIG. 5.

The client computer system 150 may access the computer system 105 to receive estimates of risk of the portfolio to values of parameters. For example, the client computer system 150 may provide the computer system 105 with values for the parameters, and the computer system may return an estimate of the risk of the portfolio to the provided values. Alternatively or additionally, the client computer system 150 may access previously calculated risk measurements from the base risk measurements 140 of the computer system 105. The client computer system may use the accessed risk measurements to estimate measurements of risk of the portfolio to parameter values. In such an implementation, the client computer system 150 may include an interpolation module 145. In addition, the client computer system 150 may include a copy of the portfolio holdings 130.

The network 155 typically includes a series of portals interconnected through a coherent system. Examples of the network 155 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (DSL)), or any other wired or wireless network. The network 155 may include multiple networks or subnetworks, each of which may include, for example, a wired or wireless data pathway.

The client systems 105 and 150 are connected to the network 155 through various communication channels, such as a modem connected to a telephone line (using, for example, serial line internet protocol (SLIP) or point-to-point protocol (PPP)) or a direct internetwork connection (using, for example, transmission control protocol/internet protocol (TCP/IP)). Each of the computer system 105 and the client computer system 150 may include a network adapter. The computer systems 105 and 150 may use the network adaptor to communicate with one another and with other network devices through the network 155. If, for example, the client computer system 150 is a mobile device, the client computer system 150 uses its network adaptor to communicate with computer system 105 over a wireless connection.

Figure 4:
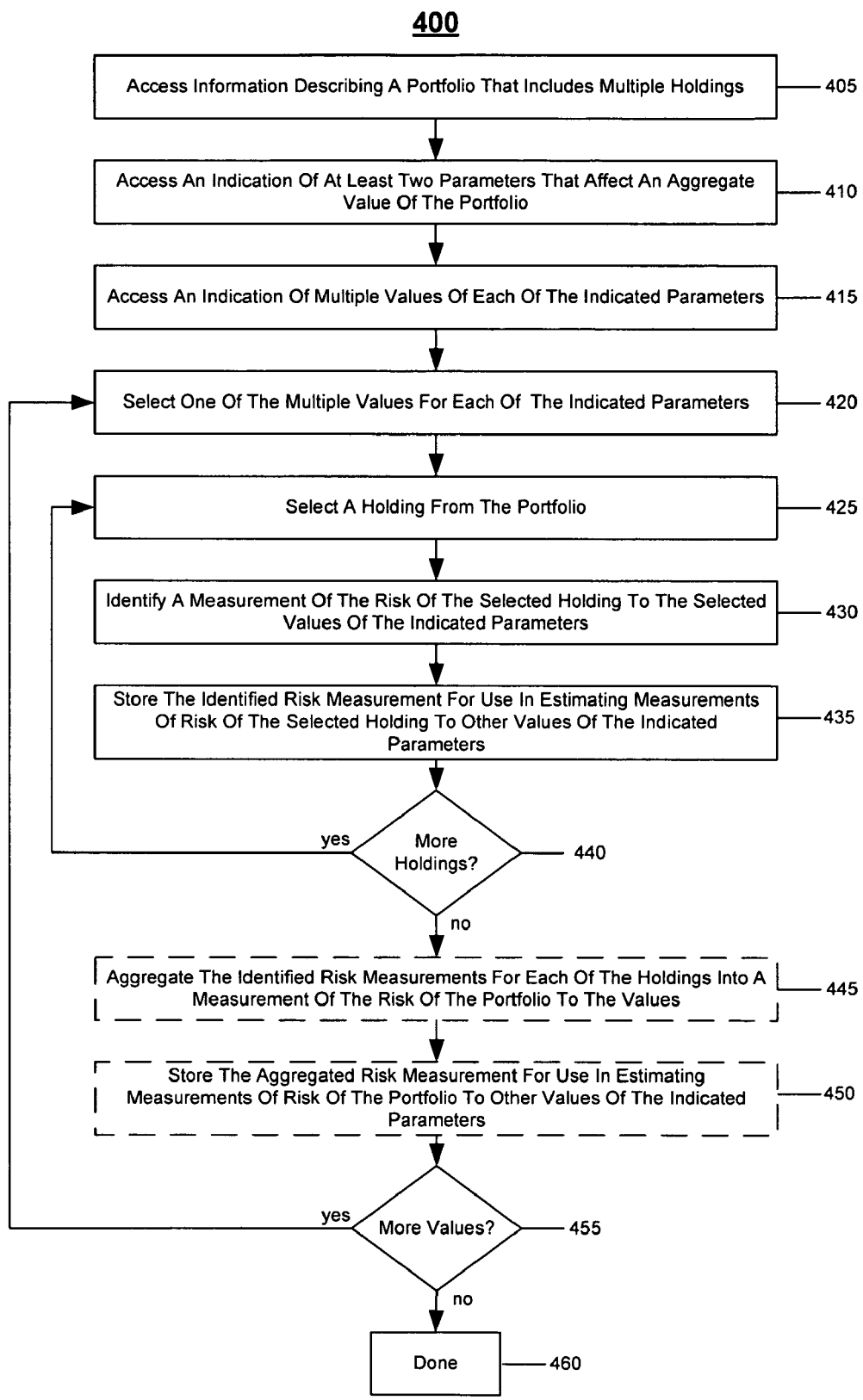
FIG. 4 is a flow chart of a process for pre-calculating measurements of risk of a portfolio to values of parameters that affect a value of the portfolio.

Referring to FIG. 4, a process 400 is used to calculate measurements of risk of at least one holding from a portfolio to multiple values of at least two parameters that affect the total value of the portfolio. In other words, the process 400 is used to calculate measurements of risk of the at least one holding from the portfolio to multiple sets of values of the at least two parameters. Each set of values includes a value of each of the at least two parameters. Such analysis may be referred to as stress testing or scenario analysis. The calculated risk measurements may be used to estimate a measurement of risk of the at least one holding to different values of the parameters. The process 400 may be implemented as a preprocessing module, such as the preprocessing module 135 of FIG. 1. The process 400 may be executed by a processor of a computer system on which the preprocessing module is stored, such as the processor 110 of FIG. 1. The processor may execute the process 400 at a time when the portfolio holdings may not be traded.

The processor accesses information describing a portfolio that includes multiple holdings (step 405). The processor may access the information describing the portfolio from a persistently stored indication of the holdings, such as the portfolio holdings 130 of FIGS. 1 and 2. The information describing the portfolio may include indications of the quantities of the holdings included in the portfolio, such as the quantities 210*a*-210*n* of the holdings 205*a*-205*n* of FIG. 2. In addition, the information describing the portfolio may include indications of the prices of the portfolio holdings, such as the prices 215*a*-215*n* of FIG. 2.

The processor accesses an indication of at least two parameters that affect an aggregate value of the portfolio (step 410). The processor also accesses an indication of multiple values of each of the indicated parameters (step 415). The parameters may be a maturity interest rate, a price of an exchange-traded stock, a price of a maturity bond, a price of a credit default swap, or a current foreign exchange rate. At least one of the parameters may be referred to as a state variable, and the other parameters may be referred to as non-state variables. State variables are parameters that have a relatively large effect on the value of the portfolio. Non-state variables are parameters that have a relatively small effect on the value of the portfolio, when compared to the effect of the state variables on the portfolio. In some implementations, the indications of the one or more parameters and the multiple values of each of the parameters may be provided by user input. For example, a user may identify non-state variables, whereas state-variables may be identified programmatically. Alternatively or additionally, the indication of the parameters may be stored within a storage device, such as the storage device 125 of FIG. 1. More particularly, the indication may be stored within a preprocessing module that is stored on the storage device, such as the preprocessing module 135 of FIG. 1.

The processor selects one of the multiple values for each of the indicated parameters (step 420), and one of the holdings from the portfolio (step 425). The processor identifies a measurement of risk of the selected holding to the selected values of the indicated parameters (step 430). In one implementation, a finite-difference method is used to identify the measurement of risk of the selected holding to the selected values. In a finite-difference method, the risk measurement is calculated as an approximate numerical solution to partial differential equations through placement of the equation onto a lattice. Such pricing equations, which are called equations of motion in mathematical physics parlance, often are derivable given a particular stochastic process for the underlying securities. Given this pricing equation, the result of a numerical solution gives a value of the derivative price for particular underlying parameter values.

The processor stores the identified risk measurement for use in estimating measurements of risk of the selected holding to other values of the indicated parameters (step 435). Consequently, the identified risk measurement is accessible for later use, for example, in estimating other risk measurements for the selected holding. The preprocessor may store the identified risk measurement within a persistently stored indication of base risk measurements, such as the base risk measurements 140 of FIG. 1.

The processor determines whether measurements of risk are to be identified for more holdings from the portfolio (step 440). For example, the processor may determine whether measurements of risk have been identified for all of the portfolio holdings. If measurements of risk are to be identified for more holdings, then the processor selects a different holding from the portfolio (step 425), identifies a measurement of risk of the different holding to the selected values (step 430), and stores the identified risk measurement for later use (step 435). In this manner, measurements of risk of each of the holdings from the portfolio may be identified sequentially.

After measurements of risk to the selected values have been calculated for each of the holdings of the portfolio (step 440), the processor may aggregate the identified risk measurements for the holdings into a measurement of risk of the portfolio to the selected values (step 445). The processor may store the aggregated risk measurement for use in estimating measurements of risk of the portfolio to other values of the indicated parameters (step 450). Consequently, the aggregated risk measurement is accessible for later use, for example, in estimating other risk measurements for the portfolio. The preprocessor may store the aggregated risk measurement within a persistently stored indication of base risk measurements, such as the base risk measurements 140 of FIG. 1.

The processor determines whether measurements of risk of the holdings to other values of the parameters are to be identified (step 455). In other words, the processor determines whether risk measurements have been identified for all combinations of the multiple values of each of the indicated parameters. If measurements of risk of the holdings to other values of the parameter are to be identified, then the processor selects a different one of the multiple values for each of the indicated parameters (step 460), and identifies measurements of risk of the holdings of the portfolio to the different values (steps 425-440). The processor also may identify (step 445) and store (step 450) a measurement of risk of the portfolio to the different values. In this way various sensitivities to the underlying parameters can be calculated. This collection of prices and/or sensitivities for various values of the underlying parameters is the basic data set, which, when combined with polynomial interpolation and/or Taylor Series expansion, can be used to estimate prices or sensitivities (collectively: risks) at identified values of the underlying parameters.

Figure 5:
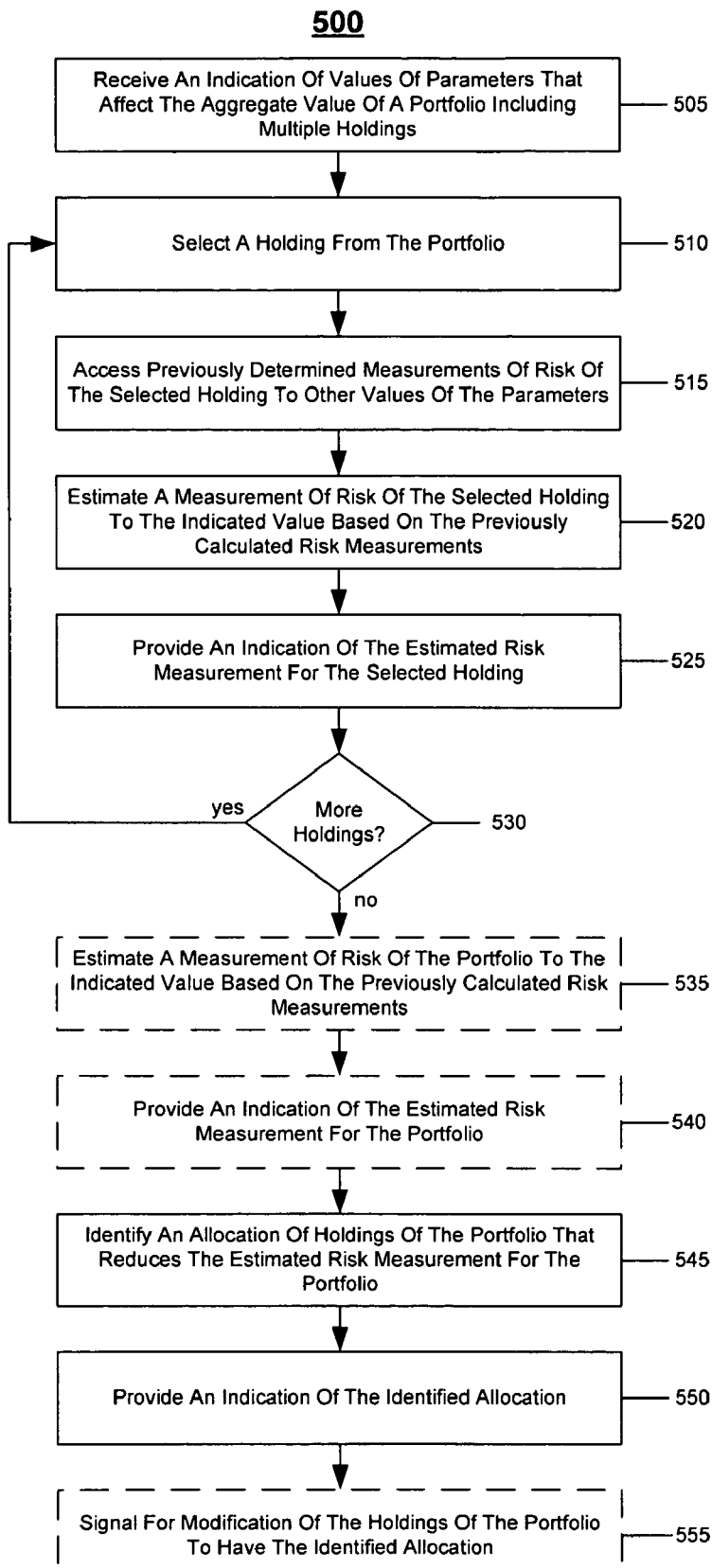
FIG. 5 is a flow chart of a process for estimating a measurement of risk of a portfolio to values of parameters that affects a value of the portfolio based on previously calculated measurements of risk of a portfolio to other values of the parameters.

Referring to FIG. 5, a process 500 is used to estimate a measurement of risk of at least one holding from a portfolio to values of parameters that affect the aggregate value of the portfolio. In other words, the process 500 is used to estimate measurements of risk of the at least one holding from the portfolio to a set of values of the at least two parameters that includes a value of each of the at least two parameters. The measurement of risk of the holding to the values is estimated based on previously calculated measurements of risk of the holding to other values of the parameters. In some implementations, the process 500 may be implemented as an interpolation module, such as the interpolation module 145 of FIG. 1. The process 500 may be executed by a processor of a computer system on which the interpolation module is stored, such as the processor 110 of FIG. 1. The process 500 may be executed after execution of the process 400 of FIG. 4 has been completed. In addition, the process 500 may be executed at a time when the portfolio holdings are permitted to be traded, for example, because parameter values for which risk measurements are needed may be identified at such a time, and because the holdings may be traded to reduce the estimated risk measurement at such a time.

The processor first receives an indication of values of parameters that affect the aggregate value of a portfolio including multiple holdings (step 505). The parameters may include a maturity interest rate, a price of an exchange-traded stock, a price of a maturity bond, a price of a credit default swap, or a current foreign exchange rate. Some of the parameters may represent state variables, and others of the parameters may represent non-state variables. In one implementation, the indication of the values of the parameters may be provided by a user. In another implementation, the indication of the values of the parameters may be stored within a storage device, such as the storage device 125 of FIG. 1. More particularly, one or more of the indications may be stored within an interpolation module that is stored on the storage device, such as the interpolation module 145 of FIG. 1. In another example, one or more of the indications may be received from a client computer system, such as the client computer system 150 of FIG. 1. In yet another example, one or more of the indications may be received from an external system, such as a source of information describing a market in which the portfolio holdings may be traded. For example, the indication may be received from a ticker that periodically provides values of the parameters during a time at which the multiple holdings may be traded.

The processor selects a holding from the portfolio (step 510). The processor accesses previously calculated measurements of risk of the selected holding to other values of the parameters (step 515). The processor may access the previously calculated risk measurements from a stored indication of the measurements, such as the base risk measurements 140 of FIG. 1. The measurements may have been calculated and stored previously through execution of the process 400 of FIG. 4.

The processor estimates a measurement of risk of the selected holding to the indicated values based on the previously calculated risk measurements (step 520). More particularly, in an implementation where some of the parameters are state variables and other parameters are non-state variables, the processor performs a Taylor Series expansion in the state variables using the previously calculated risk measurements. The Taylor Series expansion is used to estimate the risk of the portfolio to the indicated parameter values as a function of the state variables based on the indicated values of the non-state variables. The number of terms in the Taylor Series expansion may depend on a given range of the non-state variables over which the risk measurement is to be estimated and a required accuracy tolerance for the result. The result of the Taylor Series expansion is multiple estimated risk measurements for various values of the state variables.

In order to estimate the risk measurement for the holding to the indicated parameters, the processor performs polynomial interpolation between the multiple estimated risk measurements that resulted from the Taylor Series expansion. The value of the polynomial interpolation at the indicated values of the state variables represents the estimated risk measurement for the holding. In some implementations, polynomial interpolation is performed using only those of the multiple estimated risk measurements that correspond to values of the state variables that are close to the indicated state variable values.

The processor provides an indication of the estimated risk measurement for the selected holding (step 525). For example, the processor may signal for an indication of the risk measurement to be presented on a GUI that is displayed on a display that is accessible to the processor, such as the display 120 of FIG. 1. Alternatively or additionally, the processor may provide the indication of the estimated risk measurement to the client computer system that provided the indication of the values of the parameters for which the risk measurement was estimated. For example, the processor may provide the indication to the client computer system 150 of FIG. 1 such that the indication may be presented on a GUI that is displayed on a display of the client computer system 150.

The processor determines whether measurements of risk are to be estimated for more holdings from the portfolio (step 530). If so, then the processor selects a different holding from the portfolio (step 510) and accesses previously calculated measurements of risk of the selected holding to other values of the parameters (step 515). The processor estimates a measurement of risk of the different holding to the indicated values based on the previously calculated risk measurements (step 520) and provides an indication of the estimated risk measurement for the selected holding (step 525). In this manner, estimates of the risk of each of the holdings from the portfolio may be estimated sequentially.

After measurements of risk have been estimated for each of the holdings in the portfolio (step 530), the processor may estimate a risk of the portfolio as a whole to the indicated values based on the previously calculated risk measurements (step 535). In one implementation, the processor may aggregate the estimated risk measurements for the portfolio holdings into the estimate of risk of the portfolio to the indicated values. In another implementation, the processor may aggregate the previously calculated measurements of risk of the portfolio holdings to the other holdings into risk measurements for the portfolio to the other values. The processor then may estimate the measurement of risk of the portfolio to the values based on the aggregated risk measurements. The processor may provide an indication of the estimated risk measurement for the portfolio, as was done for the estimated risk measurements for each of the portfolio holdings (step 540).

Having estimated the measurement of risk of the portfolio to the indicated values, the processor determines how to reduce the risk of the portfolio to the indicated values. In one implementation, the processor identifies an allocation of the holdings of the portfolio that reduces the estimated risk measurement for the portfolio (step 545). For example, a user may identify a particular security to hedge the estimated risk of the portfolio, and the processor may receive an indication of the particular security. The processor subsequently may identify an allocation of the particular security such that the particular security reduces the estimated risk when the allocation of the particular security is added to the portfolio. As another example, the processor may identify a holding with the highest risk measurement, and may indicate that some or all of the units of the identified holding should be sold to reduce the risk of the portfolio. The processor provides an indication of the identified allocation (step 550). The indication of the identified allocation may be provided in a manner similar to how the indication of the estimated risk measurements was provided. The processor may signal for modification of the holdings of the portfolio such that the holdings have the identified allocation (step 555). For example, the processor may provide an indication of the identified allocation to a trading system. The trading system may visually display the allocation as a recommended trade, specifying an amount of the particular security that is to be bought or sold. The trading system also may execute one or more sales or purchases to provide the portfolio with the identified allocation automatically using an electronic communications network (ECN) or another automated trading system.

Referring to FIG. 6, an example of a graphical user interface 600 may be used to present measurements of risk of holdings of a portfolio to values of parameters that affect a value of the portfolio. The interface may include a portfolio holdings list 605 and a parameter value list 610. The interface 600 also includes a risk measurement display 615 that presents measurements of risk of the holdings listed in the holding list 605 to values of the parameters listed in the parameter value list 610. In addition, the interface includes a trading tool 620 that enables a user to signal for trades, for example, to reduce the risk measurements displayed in the risk measurement display 615.

In the illustrated implementation, the portfolio includes four holdings, as indicated by the portfolio holdings list 605. Values for two parameters are displayed within the parameter value list 610. More particularly, ranges of values of two parameters for which risk measurements may be estimated are displayed within the parameter value list 610. The range of values for one of the listed parameters represents a range of values within which several risk measurements were determined previously. Consequently, the range of values defines a range of values for which risk measurements may be estimated. For example, an entry 610a in the parameter value list 610 indicates that risk measurements may be estimated for interest rate values between 0.50% and 4.00%. Similarly, an entry 610b in the parameter value list 610 indicates that risk measurements may be estimated for price values between $1.00 and $3.00.

In one implementation, the user may specify the ranges that are included in the list 610. In another implementation, each of the listed ranges may have been identified automatically. For example, multiple different values of a parameter for which risk measurements of the portfolio were calculated previously may indicate a range of values of the parameter that is included in the list 610. More particularly, if risk measurements were calculated for a parameter with values of two and three, a range values of the parameter extending between two and three may be included in the list 610, for example, because the measurements of the risk for the parameter values of two and three may be used to interpolate risk measurements for parameter values between two and three.

Measurements of risk of the portfolio holdings and the portfolio as a whole to particular parameter values from the ranges indicated by the list 610 are presented in the risk measurement display 615. For example, in the illustrated implementation, the values of holdings 1, 3, and 4 change $100 in response to a price of $2.55 and a 1.23% interest rate, and the value of holding 2 changes $500 in response to the $2.55 price and the 1.23% interest rate. The risk measurement for the portfolio is sum of the risk measurements for the portfolio holdings. Consequently, the value of the entire portfolio changes $800 in response to the $2.55 price and the 1.23% interest rate. The particular values within the corresponding range for which risk measurements are estimated may be provided by a user, or by an automatic source of values from the range, such as a ticker that provides parameter values while the portfolio holdings may be traded.

The risk measurement display 615 also includes an indication of how the portfolio should be reallocated to minimize the risk to the selected parameter values. For example, in the illustrated implementation, selling four units of holding 2 reduces the change in portfolio value that occurs in response to the selected parameter values to $400. The risk measurements and the reallocation strategy, for example, may be calculated through execution of the process 500 of FIG. 5.

In response to the recommended reallocation, the user may use the trading tool 620 to trade the holdings of the portfolio such that the portfolio has the recommended allocation. For example, the user may use the trading tool 620 to sell three units of holding 2. The trading tool 620 may enable the user to specify a name of a security to be traded, whether the security is being bought or sold, an amount of the security being traded, and a price of the security. In addition, the user may use the trading tool 620 to execute other trades that are not necessarily in response to an estimated risk measurement presented in the risk measurement display 615. The effects of trades executed with the trading tool 620 may be identified in the portfolio holdings list 605. In some implementations, rather than requiring the user to manually use the trading tool 620 to provide the portfolio with the recommended allocation, trades may be executed automatically to provide the portfolio with the recommended allocation.

The implementation of the interface 600 illustrated in FIG. 6 may be used for an exemplary portfolio including four holdings. However, the illustrated implementation of the interface 600 is presented for exemplary purposes only, and other implementations of the interface 600 may be used for portfolios including a larger number of holdings. In addition, the parameter list 610 may include values for a larger number of parameters that affect the value of the portfolio. In addition, the risk measurement display 615 may include estimated risk measurements of the holdings of the portfolio to multiple ones of the values identified by the parameter list 610. The risk measurement display 615 also may include other information describing the holdings of the portfolio and the portfolio as a whole, such as price histories of the holdings.

A set is used throughout to describe a collection of values of multiple parameters. The set includes a value for each of the multiple parameters. The set is not used to describe a formal set or series from mathematics. Furthermore, the set is not described as having properties of a formal set or series.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method, performed at least in part by a computer, for providing an estimate of risk of a portfolio of a plurality of financial investment holdings to fluctuations in a portfolio value, the method comprising:

receiving, by a computer processor, an indication of a first set of values of at least two parameters, the first set of values including a first value for each of the at least two parameters;

accessing, from a computer memory, an indication of a predetermined measurement of risk of a portfolio holdings to a second set of values of the at least two parameters, the second set of values including a second value for each of the at least two parameters;

accessing, from the computer memory, an indication of a predetermined measurement of risk of the portfolio holdings to a third set of values of the at least two parameters, the third set of values including a third value for each of the at least two parameters such that the third set of values is different from the second set of values; and performing a stress testing estimating a measurement of risk of the portfolio holdings by performing operations that include:

performing by one or more computer processors a Taylor Series expansion identifying multiple estimated measurements of risk of the portfolio holdings to multiple values of one of the at least two parameters based on the accessed indication of the predetermined measurement of risk of the portfolio holdings to the second set of values, and the accessed indication of the predetermined measurement of risk of the portfolio holdings to the third set of values; and performing by the one or more computer processors a polynomial interpolation estimating a measurement of risk of the portfolio holdings to the first set of values based on the multiple estimated measurements of risk, wherein the operations performed for the stress testing include the Taylor Series expansion performed on a set of previously calculated risk measurements that reflect the outputs of a finite difference grid model where each term in the Taylor Series expansion is a prescription for the polynomial interpolation.

2. The method of claim 1 further comprising:
identifying by the one or more computer processors the predetermined measurement of risk of the portfolio holdings to the second set of values;
making by the one or more computer processors an indication of the predetermined measurement of risk of the portfolio holdings to the second set of values accessible for later use;
identifying by the one or more computer processors the predetermined measurement of risk of the portfolio holdings to the third set of values; and
making by the one or more computer processors an indication of the predetermined measurement of risk of the portfolio holdings to the third set of values accessible for later use.

3. The method of claim 2 further comprising:
accessing, from the computer memory, an indication of multiple values of the at least two parameters;
identifying by the one or more computer processors, for each set of values of the at least two parameters including one of a subset of the multiple values for each of the at least two parameters, a predetermined measurement of risk of the portfolio holdings to the set of values; and
making by the one or more computer processors, for the each set of values, an indication of the predetermined measurement of risk of the portfolio holdings to the set of values accessible for later use.

4. The method of claim 2 further comprising:
identifying by the one or more computer processors, for each of a first subset of the portfolio holdings, a predetermined measurement of risk of the portfolio holdings to the second set of values;
making by the one or more computer processors, for each of the first subset of the portfolio holdings, an indication of the predetermined measurement of risk of the portfolio holdings to the second set of values accessible for later use;

identifying by the one or more computer processors, for each of a second subset of the portfolio holdings, a predetermined measurement of risk of the portfolio holdings to the third set of values; and
making by the one or more computer processors, for each of the second subset of the portfolio holdings, an indication of the predetermined measurement of risk of the portfolio holdings to the third set of values accessible for later use.

5. The method of claim 2 wherein:
identifying the predetermined measurement of risk of the portfolio holdings to the second set of values comprises identifying the predetermined measurement of risk of the portfolio holdings to the second set of values at a time when the portfolio holdings may not be traded; and
identifying the predetermined measurement of risk of the portfolio holdings to the third set of values comprises identifying the predetermined measurement of risk of the portfolio holdings to the third set of values at a time when the portfolio holdings may not be traded.

6. The method of claim 2 wherein:
identifying the predetermined measurement of risk of the portfolio holdings to the second set of values comprises identifying the predetermined measurement of risk of the portfolio holdings to the second set of values before the indication of the first set of values is received; and
identifying the predetermined measurement of risk of the portfolio holdings to the third set of values comprises identifying the predetermined measurement of risk of the portfolio holdings to the third set of values before the indication of the first set of values is received.

7. The method of claim 1 wherein:
receiving the indication of the first set of values comprises receiving the indication of the first set of values at a time when the portfolio holdings are permitted to be traded.

8. The method of claim 1 further comprising:
accessing, from the computer memory, an indication of a predetermined measurement of risk of a second portfolio holdings to the second set of values;
accessing, from the computer memory, an indication of a predetermined measurement of risk of the second portfolio holdings to the third set of values;
performing by the one or more computer processors the Taylor Series expansion identifying multiple estimated measurements of risk of the second portfolio holdings to multiple values of one of the at least two parameters based on the accessed indication of the predetermined measurement of risk of the second portfolio holdings to the second set of values and the accessed indication of the predetermined measurement of risk of the second portfolio holdings to the third set of values; and
performing by the one or more computer processors the polynomial interpolation estimating a measurement of risk of the second portfolio holdings to the first set of values based on the multiple estimated measurements of risk.

9. The method of claim 1 further comprising:
accessing, from the computer memory, for each of a first subset of the portfolio holdings, an indication of a predetermined measurement of risk of the portfolio holdings to the second set of values;
accessing, from the computer memory, for each of a second subset of the portfolio holdings, an indication of a predetermined measurement of risk of the portfolio holdings to the third set of values; and
estimating by the one or more computer processors a measurement of risk of the portfolio holdings to the first set of values based on the accessed indication of the predetermined measurement of risk of the first subset of the portfolio holdings to the second value and the accessed indication of the predetermined measurement of risk of the second subset of the portfolio holdings to the third value.

10. The method of claim 9 wherein estimating the measurement of risk of the portfolio holdings to the first set of values comprises:
estimating, for each of the portfolio holdings, a measurement of risk of the portfolio holdings to the first set of values based on the accessed indication of the predetermined measurement of risk of the portfolio holdings to the second set of values and the accessed indication of the predetermined measurement of risk of the portfolio holdings to the third set of values; and
aggregating the estimated measurements for the portfolio holdings into an estimate of the measurement of risk of the portfolio holdings to the first set of values.

11. The method of claim 9 wherein estimating the measurement of risk of the portfolio holdings to the first set of values comprises:
aggregating the predetermined measurement of risk of the portfolio holdings to the second set of values into a measurement of risk of the portfolio holdings to the second set of values;
aggregating the predetermined measurement of risk of the portfolio holdings to the third set of values into a measurement of risk of the portfolio holdings to the third set of values; and
estimating the measurement of risk of the portfolio holdings to the first set of values based on the measurement of risk of the portfolio holdings to the second set of values and the measurement of risk of the portfolio holdings to the third set of values.

12. The method of claim 9 further comprising:
identifying by the one or more computer processors an allocation of the portfolio holdings that reduces the estimated measurement of risk of the portfolio holdings to the first set of values.

13. The method of claim 12 further comprising:
modifying by the one or more computer processors the portfolio holdings to have the identified allocation.

14. The method of claim 9 wherein:
the measurement of risk of the portfolio holdings to a set of values comprises a measurement of an amount by which the set of values of the portfolio holdings changes as a result of a change in a parameter from an original set of values to the set of values.

15. The method of claim 1 wherein the measurement of risk of the portfolio holdings to a set of values of a parameter comprises a measurement of an amount by which the set of values of the portfolio holdings changes as a result of a change in the parameter from an original set of values to the set of values.

16. The method of claim 1 wherein:
one of the at least two parameters is a state variable and others of the at least two parameters are non-state variables.

17. The method of claim 16 wherein:
using the Taylor Series expansion comprises using the Taylor Series expansion in identifying multiple estimated measurements of risk of the portfolio holdings to multiple values of the state variable based on an accessed indication of a predetermined measurement of risk of the portfolio holdings to values of the non-state variables included in the second set of values, and an accessed indication of a predetermined measurement of risk of the portfolio holdings to values of the non-state variables included in the third set of values; and
using the polynomial interpolation comprises using the polynomial interpolation in estimating a measurement of risk of the portfolio holdings to the state variable.

18. The method of claim 17 further comprising:
identifying by the one or more computer processors a number of expansion terms to be used in the Taylor Series expansion.

19. The method of claim 1 wherein:
the portfolio holdings include at least one derivative holding.

20. The method of claim 1 wherein:
an identified parameter comprises at least one of an interest rate, a price, a maturity interest rate, a price of an exchange-traded stock, a price of a maturity bond, a price of a credit default swap, and a current foreign exchange rate.

21. A computer program product tangibly embodied in an machine-readable storage device, the computer program product including instructions that, when executed by a computer processor, provide an estimate of risk of a portfolio of a plurality of financial investment holdings to fluctuations in a portfolio value, the computer program product configured to:
receive an indication of a first set of values of at least two parameters, the first set of values including a first value for each of the at least two parameters;
access an indication of a predetermined measurement of risk of a portfolio holdings to a second set of values of the at least two parameters, the second set of values including a second value for each of the at least two parameters;
access an indication of a predetermined measurement of risk of the portfolio holdings to a third set of values of the at least two parameters, the third set of values including a third value for each of the at least two parameters such that the third set of values is different from the second set of values; and
performing a stress testing estimating a measurement of risk of the portfolio holdings by performing operations that include:
perform a Taylor Series expansion identifying multiple estimated measurements of risk of the portfolio holdings to multiple values of one of the at least two parameters based on the accessed indication of the predetermined measurement of risk of the portfolio holdings to the second set of values, and the accessed indication of the predetermined measurement of risk of the portfolio holdings to the third set of values; and
perform a polynomial interpolation estimating a measurement of risk of the portfolio holdings to the first set of values based on the multiple estimated measurements of risk, wherein the operations performed for the stress testing include the Taylor Series expansion performed on a set of previously calculated risk measurements that reflect the outputs of a finite difference grid model where each term in the Taylor Series expansion is a prescription for the polynomial interpolation.

22. The computer program product of claim 21 further configured to:
identify the predetermined measurement of risk of the portfolio holdings to the second set of values;
make an indication of the predetermined measurement of risk of the portfolio holdings to the second set of values accessible for later use;

identify the predetermined measurement of risk of the portfolio holdings to the third set of values; and make an indication of the predetermined measurement of risk of the portfolio holdings to the third set of values accessible for later use.

23. The computer program product of claim 22 further configured to:

access an indication of multiple values of the at least two parameters;

identify, for each set of values of the at least two parameters including one of a subset of the multiple values for each of the at least two parameters, a predetermined measurement of risk of the portfolio holdings to the set of values; and make, for the each set of values, an indication of the predetermined measurement of risk of the portfolio holdings to the set of values accessible for later use.

24. The computer program product of claim 22 further configured to:

identify, for each of a first subset of the portfolio holdings, a predetermined measurement of risk of the portfolio holdings to the second set of values;

make, for each of the first subset of the portfolio holdings, an indication of the predetermined measurement of risk of the portfolio holdings to the second set of values accessible for later use;

identify, for each of a second subset of the portfolio holdings, a predetermined measurement of risk of the portfolio holdings to the third set of values; and make, for each of the second subset of the portfolio holdings, an indication of the predetermined measurement of risk of the portfolio holdings to the third set of values accessible for later use.

25. The computer program product of claim 22 wherein:

identifying the predetermined measurement of risk of the portfolio holdings to the second set of values comprises identifying the predetermined measurement of risk of the portfolio holdings to the second set of values at a time when the portfolio holdings may not be traded; and identifying the predetermined measurement of risk of the portfolio holdings to the third set of values comprises identifying the predetermined measurement of risk of the portfolio holdings to the third set of values at a time when the portfolio holdings may not be traded.

26. The computer program product of claim 22 wherein:

identifying the predetermined measurement of risk of the portfolio holdings to the second set of values comprises identifying the predetermined measurement of risk of the portfolio holdings to the second set of values before the indication of the first set of values is received; and identifying the predetermined measurement of risk of the portfolio holdings to the third set of values comprises identifying the predetermined measurement of risk of the portfolio holdings to the third set of values before the indication of the first set of values is received.

27. The computer program product of claim 21 wherein:

receiving the indication of the first set of values comprises receiving the indication of the first set of values at a time when the portfolio holdings are permitted to be traded.

28. The computer program product of claim 21 further configured to:

access an indication of a predetermined measurement of risk of a second portfolio holdings to the second set of values;

access an indication of a predetermined measurement of risk of the second portfolio holdings to the third set of values;

perform the Taylor Series expansion identifying multiple estimated measurements of risk of the second portfolio holdings to multiple values of one of the at least two parameters based on the accessed indication of the predetermined measurement of risk of the second portfolio holdings to the second set of values and the accessed indication of the predetermined measurement of risk of the second portfolio holdings to the third set of values; and perform the polynomial interpolation estimating a measurement of risk of the second portfolio holdings to the first set of values based on the multiple estimated measurements of risk.

29. The computer program product of claim 21 further configured to:

access, for each of a first subset of the portfolio holdings, an indication of a predetermined measurement of risk of the portfolio holdings to the second set of values;

access, for each of a second subset of the portfolio holdings, an indication of a predetermined measurement of risk of the portfolio holdings to the third set of values; and estimate a measurement of risk of the portfolio holdings to the first set of values based on the accessed indication of the predetermined measurement of risk of the first subset of the portfolio holdings to the second value and the accessed indication of the predetermined measurement of risk of the second subset of the portfolio holdings to the third value.

30. The computer program product of claim 29 wherein estimating the measurement of risk of the portfolio holdings to the first set of values comprises:

estimating, for each of the portfolio holdings, a measurement of risk of the portfolio holdings to the first set of values based on the accessed indication of the predetermined measurement of risk of the portfolio holdings to the second set of values and the accessed indication of the predetermined measurement of risk of the portfolio holdings to the third set of values; and aggregating the estimated measurements for the portfolio holdings into an estimate of the measurement of risk of the portfolio holdings to the first set of values.

31. The computer program product of claim 29 wherein estimating the measurement of risk of the portfolio holdings to the first set of values comprises:

aggregating the predetermined measurement of risk of the portfolio holdings to the second set of values into a measurement of risk of the portfolio holdings to the second set of values;

aggregating the predetermined measurement of risk of the portfolio holdings to the third set of values into a measurement of risk of the portfolio holdings to the third set of values; and estimating the measurement of risk of the portfolio holdings to the first set of values based on the measurement of risk of the portfolio holdings to the second set of values and the measurement of risk of the portfolio holdings to the third set of values.

32. The computer program product of claim 29 further configured to:

identify an allocation of the portfolio holdings that reduces the estimated measurement of risk of the portfolio holdings to the first set of values.

33. The computer program product of claim 32 further configured to:

modify the portfolio holdings to have the identified allocation.

34. The computer program product of claim 29 wherein:
the measurement of risk of the portfolio holdings to a set of values comprises a measurement of an amount by which the set of values of the portfolio holdings changes as a result of a change in a parameter from an original set of values to the set of values.

35. The computer program product of claim 21 wherein:
the measurement of risk of the portfolio holdings to a set of values of a parameter comprises a measurement of an amount by which the set of values of the portfolio holdings changes as a result of a change in the parameter from an original set of values to the set of values.

36. The computer program product of claim 21 wherein:
one of the at least two parameters is a state variable and others of the at least two parameters are non-state variables.

37. The computer program product of claim 36 wherein:
using the Taylor Series expansion comprises using the Taylor Series expansion in identifying multiple estimated measurements of risk of the portfolio holdings to multiple values of the state variable based on an accessed indication of a predetermined measurement of risk of the portfolio holdings to values of the non-state variables included in the second set of values, and an accessed indication of a predetermined measurement of risk of the portfolio holdings to values of the non-state variables included in the third set of values; and
using the polynomial interpolation comprises using the polynomial interpolation in estimating a measurement of risk of the portfolio holdings to the state variable.

38. The computer program product of claim 37 further configured to:
identify a number of expansion terms to be used in the Taylor Series expansion.

39. The computer program product of claim 21 wherein:
the portfolio holdings include at least one derivative holding.

40. The computer program product of claim 21 wherein:
an identified parameter comprises at least one of an interest rate, a price, a maturity interest rate, a price of an exchange-traded stock, a price of a maturity bond, a price of a credit default swap, and a current foreign exchange rate.

* * * * *